US010305987B2

(12) United States Patent
Guo et al.

(10) Patent No.: US 10,305,987 B2
(45) Date of Patent: May 28, 2019

(54) METHOD TO SYNCRHONIZE VSAN NODE STATUS IN VSAN CLUSTER (71) Applicant: VMware, Inc., Palo Alto, CA (US)

(72) Inventors: Fei Guo, Beijing (CN); Keyong Sun, Beijing (CN); Yonggang Wang, Beijing (CN); Dousheng Zhao, Beijing (CN); Liang Li, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 489 days.

(21) Appl. No.: 15/095,455

(22) Filed: Apr. 11, 2016

(65) Prior Publication Data
US 2017/0295235 A1 Oct. 12, 2017

(51) Int. Cl.
G06F 13/00 (2006.01)
H04L 29/08 (2006.01)
H04L 12/24 (2006.01)

(52) U.S. Cl.
CPC ...... *H04L 67/1097* (2013.01); *H04L 41/0806* (2013.01); *H04L 67/145* (2013.01)

(58) Field of Classification Search
CPC ............. H04L 67/1097; H04L 41/0806; H04L 67/145
USPC ....... 709/227–229, 231, 232, 201, 213, 214, 709/217–219
See application file for complete search history.

(56) References Cited

U.S. PATENT DOCUMENTS

| 9,806,896 | B2 * | 10/2017 | Xiang | H04L 12/1868 |
| 2007/0277227 | A1 * | 11/2007 | Brendel | G06F 17/30091 726/3 |
| 2011/0090816 | A1 * | 4/2011 | Dutt | H04L 45/00 370/254 |
| 2016/0094356 | A1 * | 3/2016 | Xiang | H04L 12/1868 370/390 |
| 2016/0205008 | A1 * | 7/2016 | Dasu | H04L 43/0888 709/224 |

* cited by examiner

Primary Examiner — Kenneth R Coulter
(74) Attorney, Agent, or Firm — SU IP Consulting (57) ABSTRACT A virtual machine (VM) system includes a network, hosts that are able to communicate over the network, a storage cluster of nodes made up by the hosts, and VMs running on the hosts. As part of the storage cluster, the nodes pool their storage devices into a clustered datastore shared across all the nodes. The VMs are stored in the clustered datastore. Two of the nodes take roles of a reflector node and a backup reflector node. The other nodes, excluding the reflector node but including the backup reflector node, are configured to establish unicast connections over the network with the reflector node. The nodes in the storage cluster are configured to communicate clustering service information over the unicast connections.

27 Claims, 6 Drawing Sheets

METHOD TO SYNCRHONIZE VSAN NODE STATUS IN VSAN CLUSTER

BACKGROUND

Through virtualization, virtual machines with different operating systems may run on the same physical machine. Each virtual machine (VM) is provisioned with virtual resources that provide similar functions as the physical hardware of a physical machine, such as central processing unit (CPU), memory, and network resources to run an operating system and different applications.

VMware vSphere is suite of virtualization software for implementing and managing VM infrastructure. The software includes vSphere hypervisor that implements VMs on physical machines (also referred to as "host computers" or "hosts"), Virtual SAN that pools and shares local storage across all hosts in a Virtual SAN cluster, vCenter Server that centrally provisions and manages vSphere objects, and vSphere Web Client (server) that allows web browser access to the vCenter Server. Virtual SAN software may be embedded in vSphere hypervisor software.

Virtual SAN uses the concept of a disk group as a container for solid-state drives (SSDs) and hard disk drives (HDDs). On each node that contributes storage to a Virtual SAN cluster, the node's local drives are organized into one or more disk groups. Each disk group includes one SSD that serves as read cache and write buffer, and one or more HDDs that serve as permanent storage. The aggregate of the disk groups from all the nodes form a Virtual SAN datastore distributed and shared across the nodes.

Virtual SAN introduces a converged storage-compute platform where VMs are running on hosts as usual while a small percentage of CPU and memory resources is used to serve the storage needs of the same VMs. Virtual SAN enables administrators to specify storage attributes, such as capacity, performance, and availability, in the form of simple policies on a per-VM basis.

Using the vSphere Web Client or a command line interface (CLI), an administrator accesses the vCenter Server to configure and manage Virtual SAN clusters. To create a Virtual SAN cluster, the administrator creates a new host cluster, enables Virtual SAN for the cluster, adds hosts to the cluster, adds drives on the included hosts (nodes) to a Virtual SAN datastore, and creates a Virtual SAN network that connects the nodes over a physical network (e.g., creates a vSwitch with a VMKernel port enabled with Virtual SAN traffic on each node). Instead of creating a new host cluster, the administrator can also enable Virtual SAN on an existing host cluster. The administrator creates a VM storage policy that defines storage requirements, such as capacity, performance, and availability supported by the Virtual SAN datastore, for a VM and its virtual disks. When the administrator deploys the VM storage policy on a particular VM, the Virtual SAN software places the VM in the Virtual SAN datastore based on the storage requirement of the policy.

As Virtual SAN uses a network to communicate between nodes, a properly configured and fully functioning network is essential to operations. Many Virtual SAN errors stem from improperly configured multicast, miss-matched maximum transmission unit (MTU) sizes and the like. More than simple transmission control protocol/Internet protocol (TCP/IP) connectivity is required for Virtual SAN.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

Virtual SAN (hereafter "VSAN") software stores and manages data in flexible data containers called objects. An object is a logical volume that has its data and metadata distributed as components across the entire VSAN cluster. When a VM is provisioned on a VSAN datastore, VSAN software creates an object for each virtual disk and a container object that stores all metadata files of the VM.

VSAN software includes the following modules on each node of a VSAN cluster: cluster level object manager (CLOM), distributed object manager (DOM), local log structured object management (LSOM), reliable datagram transport (RDT), and cluster monitoring, membership and directory services (CMMDS). CLOM validates resource availability, and DOM creates components and applies configuration locally through LSOM. DOM also coordinates with counterparts for component creation on other nodes. All subsequent reads and writes to objects funnel through DOM, which will take them to the appropriate components. RDT is the communication mechanism for VM disk input/output (I/O) in a VSAN network. It uses transmission control protocol (TCP) at the transport layer and it is responsible for creating and destroying TCP connections (sockets) on demand.

CMMDS is responsible for monitoring the VSAN cluster's membership, checking heartbeats between nodes, and publishing updates to the cluster directory. Other software components use the cluster directory to learn of changes in cluster topology and object configuration. For example, DOM uses the contents of the cluster directory to determine the nodes storing the components of an object and the paths by which those nodes are reachable.

To handle failures, each node plays one of three roles in the VSAN cluster: master, agent, and backup. Roles are applied during a cluster discovery when all hosts participating in the VSAN cluster elect a master.

The master node is responsible for getting CMMDS updates from the other nodes, and distributing these updates to the other nodes using a reliable ordered multicast protocol in which the backup node and the agent nodes send their updates in a serial order to the master node. If both master and backup nodes are missing, as may happen on recovery from a power failure, the nodes elect a master via a distributed consensus protocol. If the backup node is missing, the master node nominates a new backup node. If the master node is missing, the backup node takes over as a new master node, publishes that action, and nominates a new backup node.

The backup node will assume the master role when the master node fails. This will avoid a complete rediscovery of every component in the VSAN cluster, as the backup node will already have a copy of the cluster directory, and can seamlessly assume the role of master node, speeding up recovery in the event of a master failure. Otherwise, the backup node functions like an agent node.

The remaining nodes in the VSAN cluster play the agent role and may change role when master or backup node fails. Each agent node accepts local updates and forwards them to the master node for distribution to the other nodes. It also accepts updates from the master node and applies them to the local copy of the cluster directory.

The cluster directory is a key-value store where each entry is a pair of a key and a value. The master has a master copy of the cluster directory and the other nodes have to synchronize their copies of the cluster directory to the master copy. The cluster directory includes node and network health entries. Each node is responsible for publishing its identity and the identities of the network links and VSAN disks on that node, as well as the health of those elements. The cluster directory includes object entries. Each DOM instance (one per node) is responsible for publishing the identities and attributes of object components stored by the local LSOM instance on local VSAN disks, as well as its view of the objects of which those object components are members, and the disk capacity and usage of the disks the LSOM instance controls. Each DOM instance is also responsible for publishing the overall state of the objects for which it is the owner.

There are three types of communications in the VSAN cluster. First, there is the CMMDS heartbeat exchange where the master node sends a periodic heartbeat to the other nodes and receives periodic heartbeats from the other nodes. This is multicast traffic where the master node uses the default agent multicast group address 224.2.3.4 and port 23451 to send its heartbeat to the other nodes, and the other nodes use the default master multicast group address 224.1.2.3 and port 12345 to send their heartbeats to the master. The use of the master multicast group address avoids the need of the a node to know the IP address of the master node when rejoining the cluster, and it assures reliable delivery of heartbeats during master transitions from one node to another.

There are also CMMDS metadata updates where the master node keeps the other nodes up to date regarding changes to cluster topology and object configuration. This is also multicast traffic where the nodes use the default master multicast group address 224.1.2.3 and port 12345 to send their updates to the master, and the master uses the default agent multicast group address 224.2.3.4 and port 23451 to send the updates to the other nodes.

Lastly, there is VM disk I/O that forms the bulk of the VSAN network traffic. A VM object in the VSAN datastore may include components located on different nodes so disk reads and writes for the VM have to traverse the VSAN network. This is unicast traffic based on RDT.

Using multicast may cause difficulties in VSAN deployment and maintenance. To avoid causing unnecessary load on other network devices, a customer should configure layer 2 switches for Internet group management protocol (IGMP) snooping to send multicast traffic to a subset of switch ports with nodes that requested the multicast traffic. When a VSAN cluster crosses layer 3 routers, such as in the case of a stretched cluster, the customer has to configure the routers for protocol independent multicast (PIM). However, many customers find it inconvenient to reconfigure switches and routers for IGMP and PIM, and enabling PIM introduces security vulnerabilities to their networks.

While VSAN uses default multicast group addresses and ports, a customer may reconfigure them to implement multiple VSAN clusters. However, the reconfiguration of multicast group addresses and ports may conflict with those used by other applications.

The use of unicast for VM disk I/O and multicast for CMMDS causes confusion for some customers. In some cases, unicast is working properly so nodes can ping each other but multicast is not working properly so the nodes form multiple network partitions where a subset of one or more nodes in unable to communicate to another subset of nodes. In some instances, VM disk I/O is transferred to a node that CMMDS has determined to be isolated. Thus, the use of both unicast and multicast makes it difficult to debug VSAN network errors.

In examples of the present disclosure, nodes in a storage cluster use unicast instead of multicast to perform clustering services such as checking on node connectivity and monitoring cluster membership. A virtual machine (VM) system includes a network, hosts that are able to communicate over the network, and VMs running on the hosts. The hosts make up the nodes of the storage cluster and pool their storage devices into a clustered datastore shared across all the nodes. The VMs are stored in the clustered datastore. Two of the nodes take roles of a reflector node and a backup reflector node. The other nodes, excluding the reflector node but including the backup reflector node, are configured to establish unicast connections over the network with the reflector node. The nodes in the storage cluster are configured to communicate clustering service information over the unicast connections.

Figure 1:
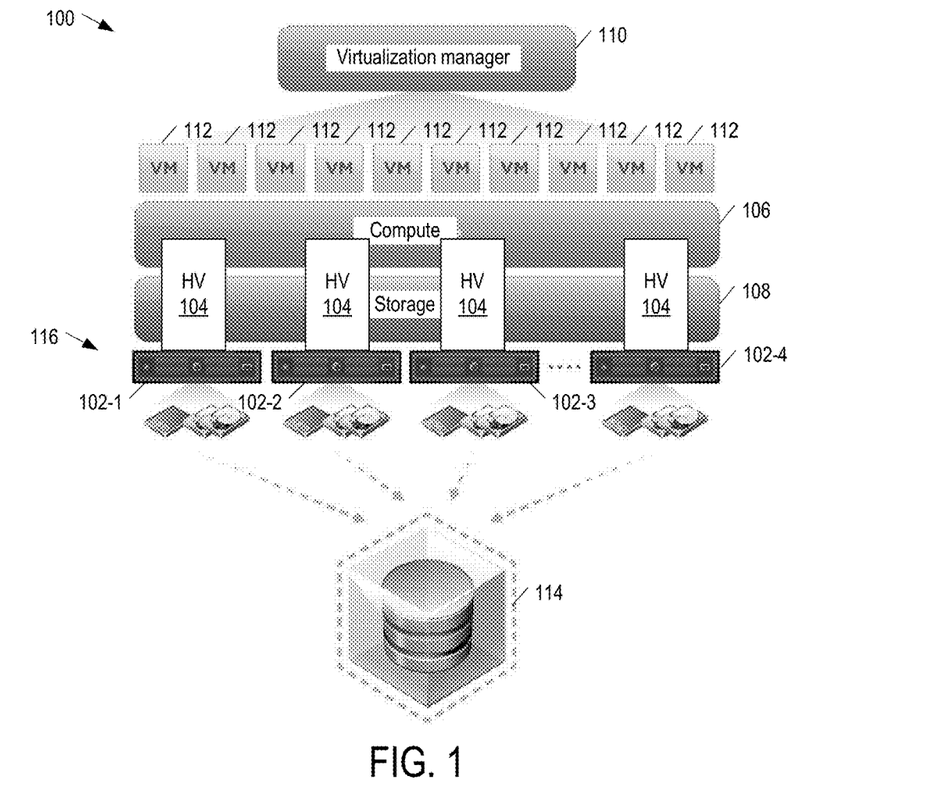
FIG. 1 is a block diagram illustrating a simplified view of a VM system in examples of the present disclosure.

FIG. 1 is a block diagram illustrating a simplified view of a VM system 100 in examples of the present disclosure. System 100 includes hosts 102-1, 102-2, 102-3, and 102-4 (collectively "hosts 102" or individually as a generic "host 102") running hypervisors 104 to provide a compute virtualization layer 106 and a storage virtualization layer 108. A virtualization manager 110 centrally provisions and manages (1) VMs 112 on compute virtualization layer 106 and (2) a clustered datastore 114 (e.g., a VSAN datastore) on storage virtualization layer 108. Hosts 102 make up nodes of a storage cluster 116 (e.g., a VSAN cluster). Nodes 102 contribute local storage resources (e.g., SSDs and HDDs) that form clustered datastore 114. Nodes 102 shares clustered datastore 114 to store VMs 112 as objects with object components distributed across the nodes. VM system 100 may be a VMware datacenter, hypervisor 104 may be VMware vSphere ESXi hypervisor embedded with VSAN, virtualization manager 110 may be VMware vCenter Server, clustered datastore 114 may be a VSAN datastore, and storage cluster 116 may be a VSAN cluster.

Figure 2:
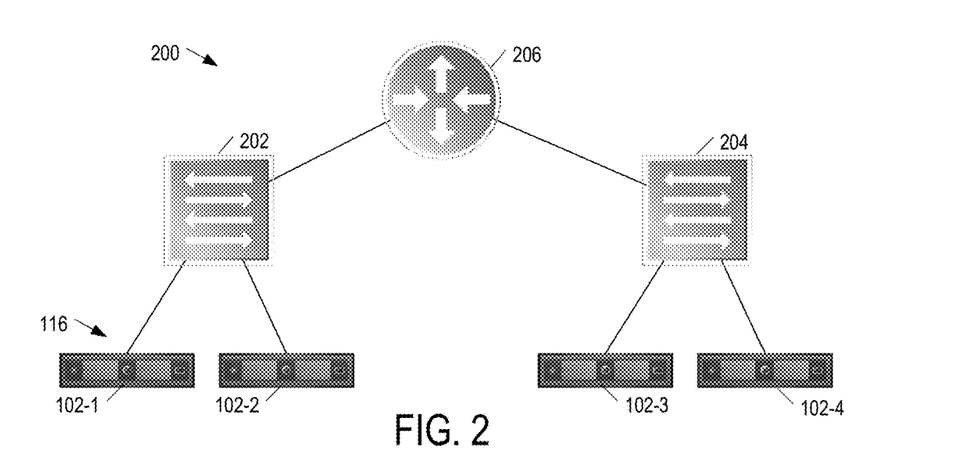
FIG. 2 is a block diagram illustrating a physical network connecting nodes in the VM system of FIG. 1 in examples of the present disclosure.

FIG. 2 is a block diagram illustrating a physical network 200 connecting nodes 102 of VM system 100 in examples of the present disclosure. Physical network 200 includes a layer 2 switch 202 connecting hosts 102-1 and 102-2, a layer 2 switch 204 connecting hosts 102-3 and 102-4, and a layer 3 router 206 connecting layer 2 switches 202 and 204. In this arrangement, storage cluster 116 is a stretched cluster that spans across layer 3 router 206.

Figure 3:
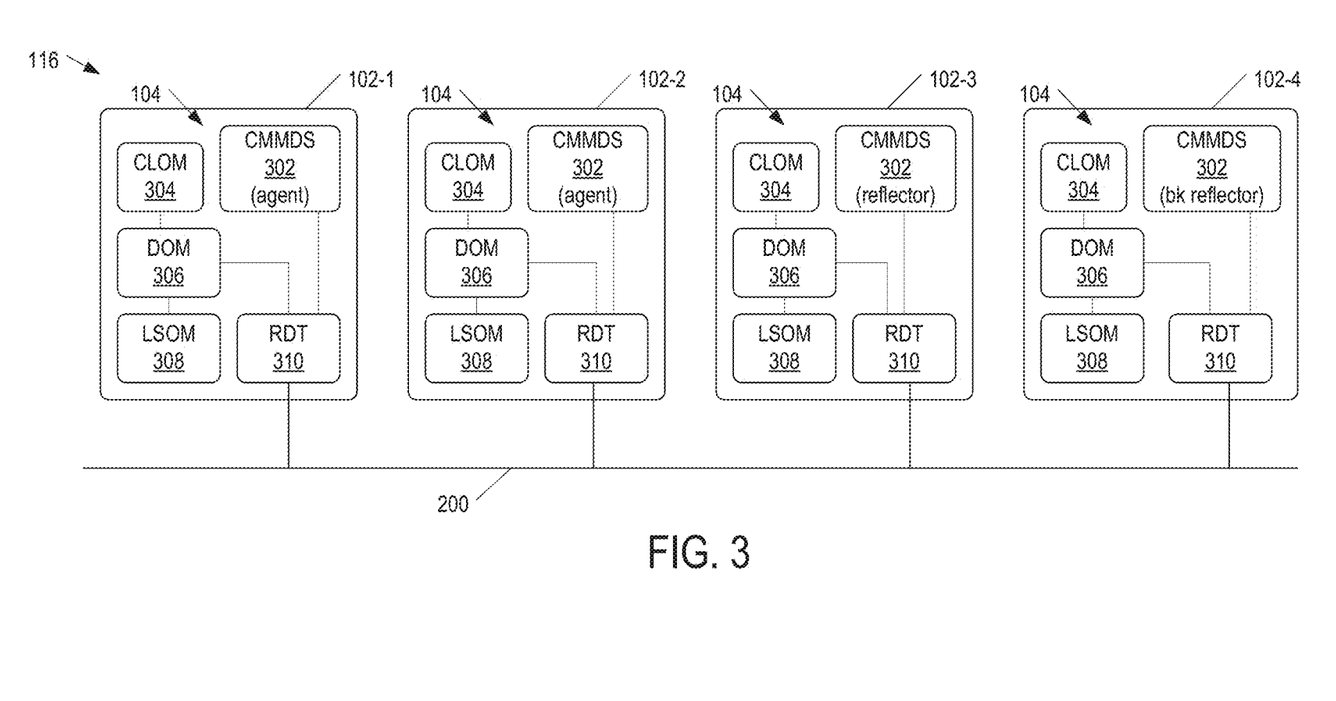
FIG. 3 is a block diagram illustrating storage virtualization software of hypervisors on the nodes of FIG. 1 in examples of the present disclosure.

FIG. 3 is a block diagram illustrating storage virtualization software of hypervisors 104 on nodes 102 in examples of the present disclosure. Each node 102 includes a clustering service module 302 that discovers, establishes, and maintains storage cluster 116. Clustering service module 302 may be a modified CMMDS module that uses unicast instead of multicast to perform clustering service functions with other nodes 102. Under clustering service module 302, node 102 assumes one of three roles: reflector node, backup reflector node, and agent node. The reflector node has unicast connections with the other nodes. The reflector node is responsible for exchanging periodic heartbeat signals with the other nodes through the unicast connections between the reflector node and the other nodes. The reflector node is also responsible for getting clustering service updates from other nodes and distributing these updates to the other nodes through the unicast connections between the reflector node and the other nodes. Clustering service updates include changes to cluster topology and object configuration, such as the change in ownership of an object when a prior owner dies and a new owner node is selected. The backup reflector node assumes the reflector role when the reflector node fails. The agent nodes may change roles when the reflector or the backup node fails.

Each node 102 further includes other modules to read and write objects saved in clustered datastore 114, such as a CLOM module 304, a DOM module 306, a LSOM module 308, and a RDT module 310.

Figure 4:
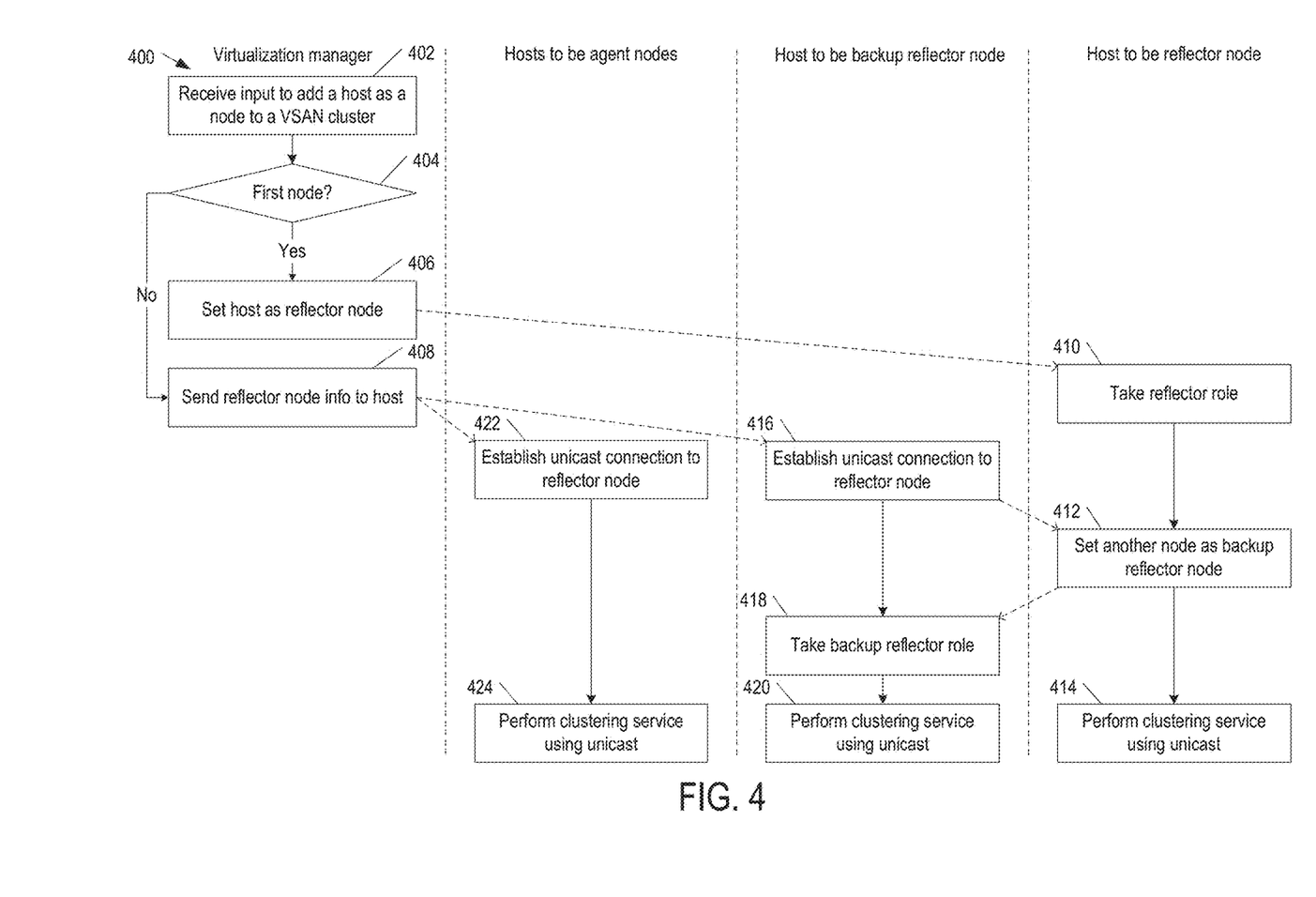
FIG. 4 is a block diagram of a method for the VM system of FIG. 1 to form a storage cluster in examples of the present disclosure.

FIG. 4 is a block diagram of a method 400 for VM system 100 (FIG. 1) to form storage cluster 116 (FIG. 1) in examples of the present disclosure. Method 400 may be implemented by non-transitory computer-readable code of virtualization manager 110 (FIG. 1) and clustering service module 302 (FIG. 3) executed by host processors. Method 400 may begin in block 402.

In block 402, virtualization manager 110 receives user input to add a host 102 as a node to storage cluster 116. As part of this process, virtual manger 110 may receive or discover the address of host 102 in network 200 (FIG. 2) and save the address for later use. Block 402 may be followed by block 404.

In block 404, virtualization manager 110 determines if host 102 is to be the first node of storage cluster 116. If so, block 404 may be followed by block 406. Otherwise block 404 may be followed by block 408.

In block 406, virtualization manager 110 sends a command to set or otherwise cause host 102 to take the reflector role in storage cluster 116. To demonstrate method 400, assume virtualization manger 110 sets host 102-3 as the reflector node in storage cluster 116. Block 406 may loop back to block 402 to add another host 102 as a node to storage cluster 116.

In block 408, virtualization manager 110 sends information about reflector node 102-3 to host 102. To demonstrate method 400, assume virtual manger 110 provides the previously saved address of reflector node 102-3 to hosts 102-1, 102-2, and 102-4. Block 408 may loop back to block 402 to add another host 102 as a node to storage cluster 116.

Instead of using virtualization manager 110, the user may use the CLI on each host to add a host as a node to storage cluster 116, set a node as a reflector node or backup reflector node, and provide the address of the reflector node to the other nodes.

In block 410, in response to the action taken by virtualization manager 110 in block 406, host 102-3 takes the reflector role in storage cluster 116. Block 410 may be followed by block 412.

In block 412, reflector node 102-3 sends a command to set or otherwise cause another node 102 to take the backup reflector role in VSAN cluster 116. To demonstrate method 400, assume reflector node 102-3 sets node 102-4 as the backup reflector node in storage cluster 116. Reflector node 102-3 may send a command to set the role of host 102-4 through a unicast connection established by host 102-4 as described later in block 416. Block 412 may be followed by block 414.

In block 414, reflector node 102-3 performs clustering service functions through various unicast connections with the other nodes 102-1, 102-2, and 102-4 in storage cluster 116. For example, reflector node 102-3 sends/receives periodic heartbeats to/from the other nodes and receives/sends clustering service updates from/to the other nodes 102 for synchronizing their cluster directories. As previously described, each node uses its cluster directory to determine the nodes storing the components of an object and the paths by which those nodes are reachable.

In block 416, in response to the action taken by virtualization manager 110 in block 408, host 102-4 receives the address of reflector node 102-3 and establishes a unicast connection with the reflector node. The unicast connection may be an RDT connection. Block 416 may be followed by block 418.

In block 418, in response to the action taken by reflector node 102-3 in block 412, node 102-4 takes the backup reflector role in storage cluster 116. Block 418 may be followed by block 420.

In block 420, backup reflector node 102-4 performs clustering service functions through its unicast connection with reflector node 102-3. For example, backup reflector node 102-4 sends/receives periodic heartbeats to/from reflector node 102-3 and sends/receives clustering service updates to/from reflector node 102-3 for synchronizing their cluster directories.

In block 422, in response to the action taken by virtualization manager 110 in block 408, host 102-1 or 102-2 receives the address of reflector node 102-3 and establishes a unicast connection with the reflector node. The unicast connection may be an RDT connection. To demonstrate method 400, hosts 102-1 and 102-2 take the agent roles in storage cluster 116 as they are neither the reflector node nor the backup reflector node. Block 422 may be followed by block 424.

In block 424, agent node 102-1 or 102-2 performs clustering service functions through its unicast connection with reflector node 102-3. For example, agent node 102-1 or 102-2 sends its periodic heartbeat to reflector node 102-3 and sends/receives clustering service updates to/from reflector node 102-3 to synchronize their cluster directories.

As part of the clustering service functions in blocks 414, 420, and 424, reflector node 102-3 may send the topology of storage cluster 116 to nodes 102-1, 102-2, and 102-3 so they would know each other's address. With this information, nodes 102-1, 102-2, and 102-3 may periodically check the connectivity between them.

As part of the clustering service functions in blocks 414, 420, and 424, reflector node 102-3 and backup reflector node 102-4 may periodically communicate with virtualization manager 110. When both reflector node 102-3 and backup reflector node 102-4 are down, virtualization manager 110 may select a new reflector node and send its address to the non-reflector nodes 102 in storage cluster 116. If there is a conflict between the address of the reflector node sent by virtualization manager 110 and the local copy of the address of the reflector node, a non-reflector node 102 should use the address provided by virtualization manager 110.

Figure 5:
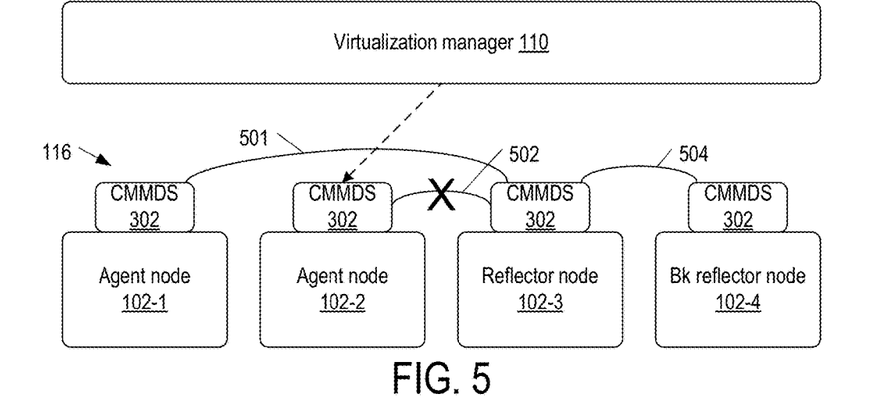
FIG. 5 is a block diagram illustrating the removal of a backup reflector or agent node from the storage cluster of FIG. 1 in examples of the present disclosure.

FIG. 5 is a block diagram illustrating the removal of a backup reflector or agent node 102 (hereafter "departing node 102") from storage cluster 116 in examples of the present disclosure. For example, assume agent node 102-2 is be removed. Prior to the removal, agent nodes 102-1, 102-2 and backup reflector node 102-4 have established unicast connections 501, 502, and 504 with reflector node 102-3, respectively, through method 400 (FIG. 4).

Figure 6:
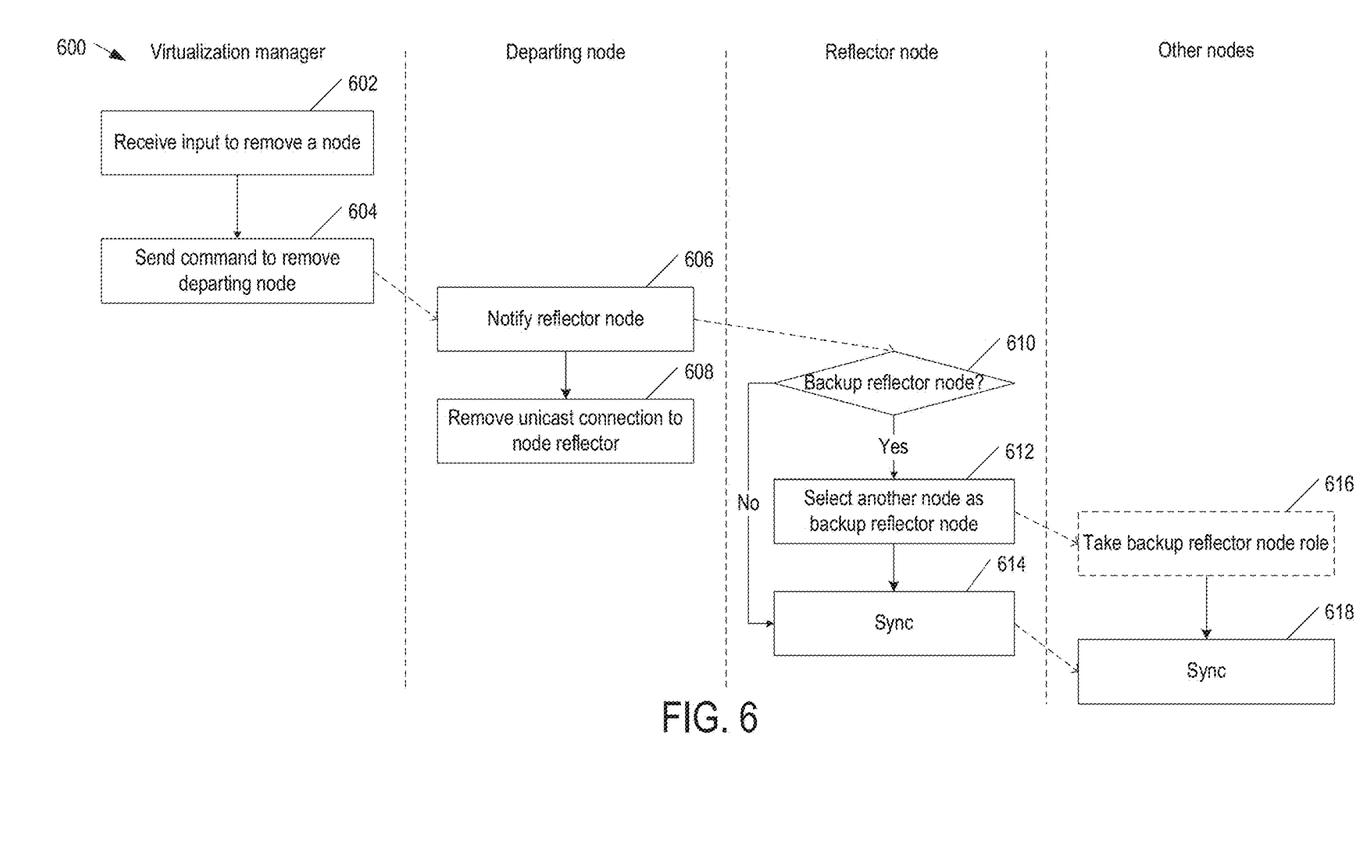
FIG. 6 is a block diagram of a method to remove a departing node form the storage cluster of FIG. 5 in examples of the present disclosure.

FIG. 6 is a block diagram of a method 600 for VM system 100 (FIG. 1) to remove departing node 102 form storage cluster 116 (FIG. 5) in examples of the present disclosure. Method 600 may be implemented by non-transitory computer-readable code of virtualization manager 110 (FIG. 5) and clustering service module 302 (FIG. 5) executed by host processors. Method 600 may begin in block 602.

In block 602, virtualization manager 110 receives user input to remove departing node 102 from storage cluster 116. Block 602 may be followed by block 604.

In block 604, virtualization manager 110 sends a command to departing node 102 to remove departing node 102 from storage cluster 116.

In block 606, in response the action taken by virtualization manager 110 in block 604, departing node 102 notifies reflector node 102-3 about its removal from storage cluster 116. Departing node 102 may send a message over its unicast connection to reflector node 102-3. Block 606 may be followed by block 608.

In block 608, departing node 102 removes its unicast connection to reflector node 102-3.

In block 610, in response to the action taken by departing node 102 in block 606, reflector node 102-3 determines if the departing node is backup reflector node 102-4 in storage cluster 116. If so, block 610 may be followed by block 612. Otherwise block 610 may be followed by block 614.

In block 612, reflector node 102-3 sets or otherwise causes another node 102 to take the backup reflector role in storage cluster 116. Reflector node 102-3 may send a command to set the backup reflector role through a unicast connection with the target node. Reflector node 102-3 also updates the cluster directory to reflect the removal of departing node 102 and any changes to the backup reflector role. Block 612 may be followed by block 614.

In block 614, reflector node 102-3 synchronizes the updates to the cluster directory with the other nodes 102 in storage cluster 116. Reflector node 102-3 may send the updates through unicast connections with the other nodes 102.

In optional block 616, in response to the action taken by reflector node 102-3 in block 612 when departing node 102 is the backup reflector node, one of the other nodes 102 takes the backup reflector role in storage cluster 116. Block 616 may be followed by block 618.

In block 618, in response to the action taken by reflector node 102-3 in block 614, each of the other nodes 102 synchronizes its cluster directory to the cluster directory of reflector node 102-3.

Figure 7:
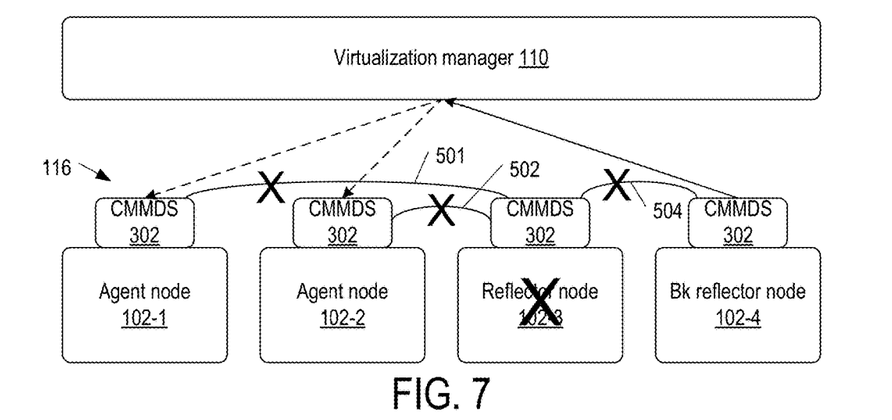
FIGS. 7 and 8 are block diagrams illustrating the failover from a reflector node to the backup reflector node in the storage cluster of FIG. 1 in examples of the present disclosure.
Figure 8:
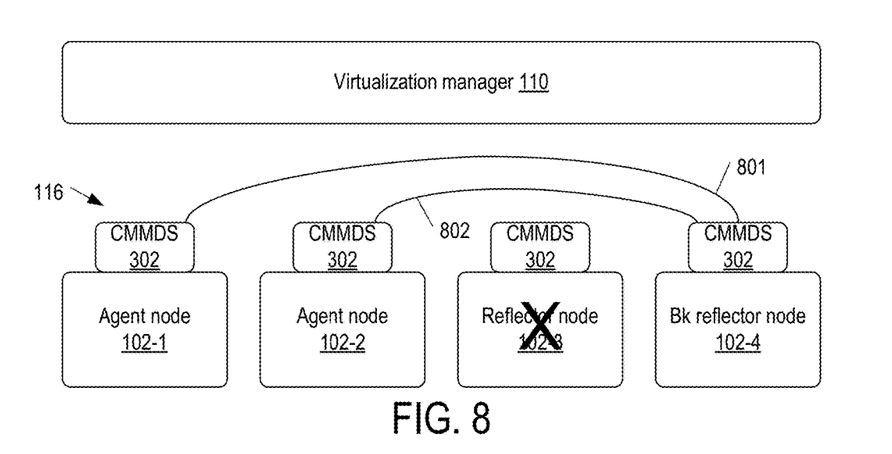

FIGS. 7 and 8 are block diagrams illustrating the failover from reflector node 102-3 to backup reflector node 102-4 in examples of the present disclosure. Prior to the failover, agent nodes 102-1, 102-2 and backup reflector node 102-4 have established unicast connections 501, 502, and 504 with reflector node 102-3, respectively. After the failover, agent node 102-1 and new backup reflector node 102-2 have established new unicast connections 801 and 802 with new reflector node 102-4, respectively.

Figure 9:
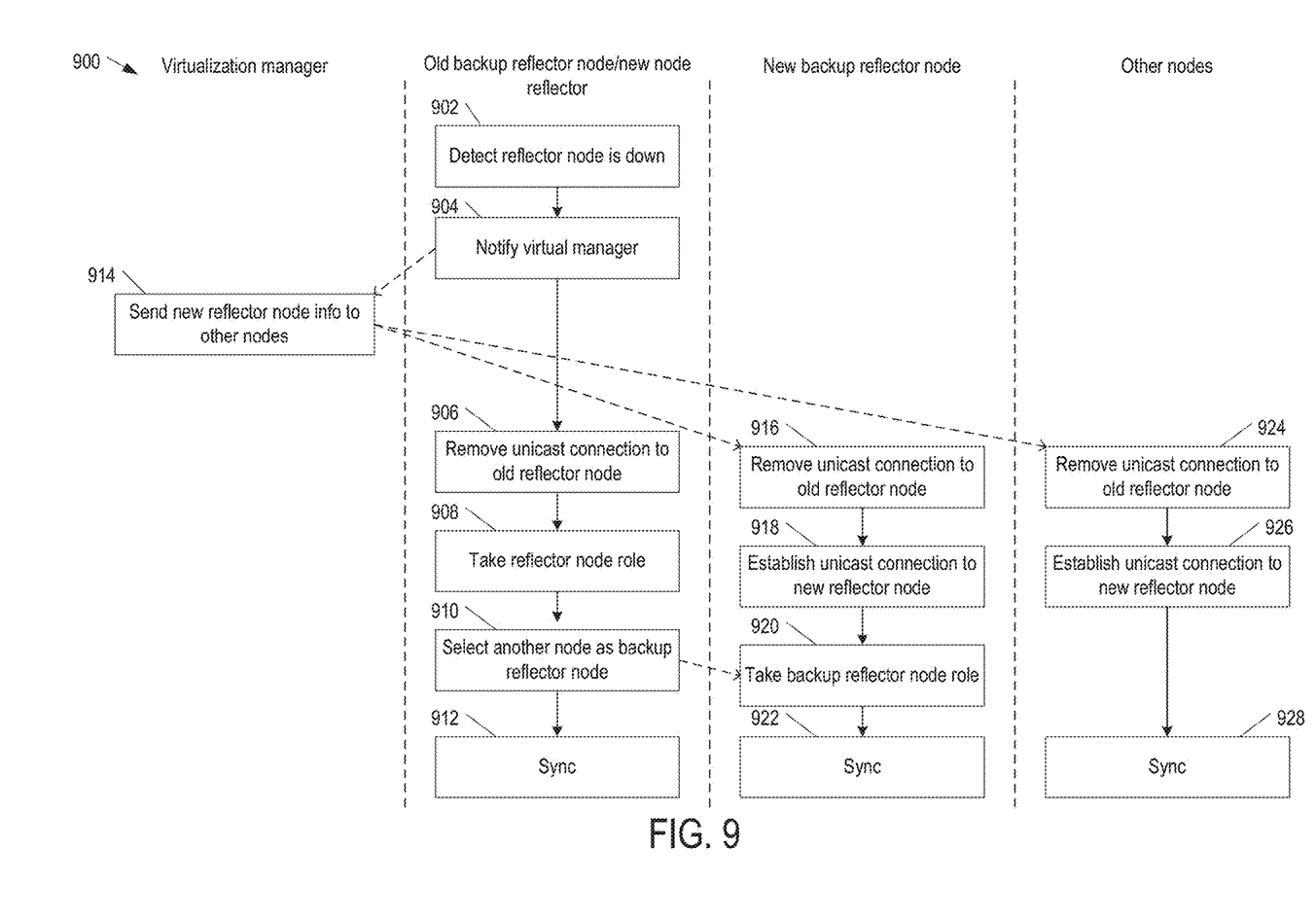
FIG. 9 is a block diagram of a method to failover from the reflector node to the backup reflector node in the storage cluster of FIG. 5 in examples of the present disclosure.

FIG. 9 is a block diagram of a method 900 for VM system 100 (FIG. 1) to failover from reflector node 102-3 (FIGS. 7 and 8) to backup reflector node 102-4 (FIGS. 7 and 8) in examples of the present disclosure. Method 900 may be implemented by non-transitory computer-readable code of virtualization manager 110 (FIGS. 7 and 8) and clustering service module 302 (FIGS. 7 and 8) executed by host processors. Method 900 may begin in block 902.

In block 902, backup reflector node 102-4 detects reflector node 102-3 is down. For example, backup reflector node 102-4 detects reflector node 102-3 is down when backup reflector node 102-4 stops receiving the periodic heartbeat from reflector node 102-3 over unicast connection 504 (FIG. 7). Block 902 may be followed by block 904.

In block 904, backup reflector node 102-4 sends a notification to virtualization manager 110 informing virtualization manager 110 that reflector node 102-3 is down. Block 904 may be followed by block 906.

In block 906, backup reflector node 102-4 removes its unicast connection 504 to reflector node 102-3. Block 906 may be followed by block 908.

In block 908, backup reflector node 102-4 changes its role from backup reflector node to reflector node. Block 908 may be followed by block 910.

In block 910, new reflector node 102-4 sets or otherwise causes another node in storage cluster 116 (e.g., agent node 102-2) to take the backup reflector role. New reflector node 102-4 may send a command to set the new role of agent node 102-2 through a unicast connection 802 (FIG. 8) established by agent node 102-2 as described later in block 918. New reflector node 102-4 also updates the cluster directory to reflect the departure of old reflector node 102-3 and the change in the backup reflector role. Block 910 may be followed by block 912.

In block 912, new reflector node 102-4 synchronizes the updates to the cluster directory with the other nodes in storage cluster 116 (e.g., agent node 102-1 and new backup reflector node 102-2). New reflector node 102-4 may send the updates through unicast connections 802 and 801 (FIG. 8) established by new backup reflector node 102-2 and agent node 102-1 as described later in block 916 and 924.

In block 914, in response to the action of new backup reflector node 102-4 in block 904, virtualization manager 110 sends the address of new reflector node 102-4 to the other nodes in storage cluster 116 (e.g., agent nodes 102-1 and 102-2). Instead of learning from backup reflector node 102-4 that reflector node 102-3 is down, virtualization manager 110 may determine reflector node 102-3 is down by checking for a periodic heartbeat sent by host 102-3 as a managed entity under virtualization manager 110.

In block 916, in response to the action of virtualization manager 110 in block 914, agent node 102-2 removes its unicast connection 502 (FIG. 7) to old reflector node 102-3. Block 916 may be followed by block 918.

In block 918, agent node 102-2 establishes a unicast connection 802 to new reflector node 102-4. Block 918 may be followed by block 920.

In block 920, in response to the action of new reflector node 102-4 in block 910, agent node 102-2 takes the backup reflector role in storage cluster 116. Block 920 may be followed by block 922.

In block 922, new backup reflector node 102-2 synchronizes its cluster directory to the cluster directory of new reflector node 102-4.

In block 924, in response to the action of virtualization manager 110 in block 914, agent node 102-1 removes its unicast connection 501 (FIG. 7) to old reflector node 102-3. Block 924 may be followed by block 926.

In block 926, agent node 102-1 establishes a unicast connection 801 to new reflector node 102-4. Block 926 may be followed by block 928.

In block 928, agent node 102-1 synchronizes its cluster directory to the cluster directory of new reflector node 102-4.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A system, comprising:
a processor; and
a non-transitory memory having stored thereon program code that causes the processor to, upon being executed:
in response to receiving a command associated with a reflector node from a centralized virtualization manager, taking a role of the reflector node;
establish unicast connections to other nodes in a storage cluster;
contribute storage devices to a clustered datastore pooled with one or more of the other nodes in the storage cluster and shared across all nodes in the storage cluster;
communicate the clustering service information with the other nodes in the storage cluster through the unicast connections;
store the one or more VMs as objects in the clustered datastore;
run one or more virtual machines (VMs); and
use a cluster directory to access the objects stored in the clustered datastore.

2. The system of claim 1, wherein the program code further causes the processor to assign one of the other nodes in the storage cluster as a backup reflector node.

3. The system of claim 1, wherein communicating the clustering service information with the other nodes in the storage cluster comprises:
sending a periodic heartbeat to a backup reflector node over a unicast connection between the reflector node and the backup reflector node; and
receiving periodic heartbeats from the other nodes over the unicast connections.

4. The system of claim 1, wherein communicating the clustering service information with the other node in the storage cluster comprises:
receiving a removal notification over a unicast connection with a node being removed from the storage cluster; and
in response to the removal notification, updating the cluster directory and sending clustering service updates to remaining nodes in the storage cluster over their remaining unicast connections.

5. A system, comprising:
a processor; and
a non-transitory memory having stored thereon program code that causes the processor to, upon being executed:
in response to receiving information associated with a reflector node from a centralized virtualization manager, establish a unicast connection with the reflector node in a storage cluster;
contribute storage devices to a clustered datastore pooled with other nodes in the storage cluster and shared across all nodes in the storage cluster;
communicate the clustering service information with the reflector node over the unicast connection;
run one or more virtual machines (VMs);
store the one or more VMs as objects in the clustered datastore; and
use a cluster directory to access the objects stored in the clustered datastore.

6. The system of claim 5, wherein communicating the clustering service information with the reflector node comprises receiving a first periodic heartbeat from the reflector node over the unicast connection or sending a second periodic heartbeat to the reflector node over the unicast connection.

7. The system of claim 5, wherein communicating the clustering service information with the reflector node comprises receiving a clustering service update from the reflector node over the unicast connection after a node has been removed from the storage cluster.

8. The system of claim 5, wherein the program code further causes the processor to:
receive a command from the reflector node to take a role of a backup reflector node; and
take the role of the backup reflector node.

9. The system of claim 8, wherein the program code further causes the processor to, after detecting the reflector node is down:
remove the unicast connection with the reflector node;
switch role to become a new reflector node;
establish new unicast connections with remaining nodes in the storage cluster;
select a new backup reflector node from the remaining nodes; and
update its cluster directory and sending clustering service updates to the remaining nodes over the new unicast connections to synchronize their cluster directories.

10. A method for a node in a storage cluster to communicate clustering service information by unicast, the method comprises:
in response to receiving a command associated with a reflector node from a centralized virtualization manager, taking a role of the reflector node;
establishing unicast connections to other nodes in the storage cluster;
contributing storage devices to a clustered datastore pooled with one or more of the other nodes in the storage cluster and shared across all nodes in the storage cluster;
communicating the clustering service information with the other nodes in the storage cluster through the unicast connections;
storing the one or more VMs as objects in the clustered datastore;

running one or more virtual machines (VMs); and using a cluster directory to access the objects stored in the clustered datastore.

11. The method of claim 10, further comprising assigning one of the other nodes in the storage cluster as a backup reflector node.

12. The method of claim 10, wherein communicating the clustering service information with the other nodes in the storage cluster comprises:

sending a periodic heartbeat to a backup reflector node over a unicast connection between the reflector node and the backup reflector node; and receiving periodic heartbeats from the other nodes over the unicast connections.

13. The method of claim 10, wherein communicating the clustering service information with the other node comprises:

receiving a removal notification over a unicast connection with a node being removed from the storage cluster; and in response to the removal notification, updating the cluster directory and sending clustering service updates to remaining nodes in the storage cluster over their remaining unicast connections.

14. A method for a node in a storage cluster to communicate clustering service information by unicast, the method comprises:

in response to receiving information associated with a reflector node from a centralized virtualization manager, establishing a unicast connection with the reflector node in the storage cluster;

contributing storage devices to a clustered datastore pooled with other nodes in the storage cluster and shared across all nodes in the storage cluster;

communicating the clustering service information with the reflector node over the unicast connection;

running one or more virtual machines (VMs);

storing the one or more VMs as objects in the clustered datastore; and using a cluster directory to access the objects stored in the clustered datastore.

15. The method of claim 14, wherein communicating the clustering service information with the reflector node comprises receiving a first periodic heartbeat from the reflector node over the unicast connection or sending a second periodic heartbeat to the reflector node over the unicast connection.

16. The method of claim 14, wherein communicating the clustering service information with the reflector node comprises receiving a clustering service update from the reflector node over the unicast connection after a node has been removed from the storage cluster.

17. The method of claim 14, further comprising:

receiving a command from the reflector node to take a role of a backup reflector node; and taking the role of the backup reflector node.

18. The method of claim 17, further comprising, after detecting the reflector node is down:

removing the unicast connection with the reflector node;

switching role to become a new reflector node;

establishing new unicast connections with remaining nodes in the storage cluster;

selecting a new backup reflector node from the remaining nodes; and updating its cluster directory and sending clustering service updates to the remaining nodes over the new unicast connections to synchronize their cluster directories.

19. A non-transitory computer-readable storage medium comprising instructions, which when executed in a computer system with a storage cluster, causes the computer system to carry out the steps of:

in response to receiving a command associated with a reflector node from a centralized virtualization manager, taking a role of the reflector node;

establish unicast connections to other nodes in the storage cluster;

contribute storage devices to a clustered datastore pooled with one or more of the other nodes in the storage cluster and shared across all nodes in the storage cluster;

communicate the clustering service information with the other nodes in the storage cluster through the unicast connections;

store the one or more VMs as objects in the clustered datastore;

run one or more virtual machines (VMs); and use a cluster directory to access the objects stored in the clustered datastore.

20. The storage medium of claim 19, further comprising instructions executable by the processor to assign one of the other nodes in the storage cluster as a backup reflector node.

21. The storage medium of claim 19, wherein communicate the clustering service information with the other nodes in the storage cluster comprises:

sending a periodic heartbeat to a backup reflector node over a unicast connection between the reflector node and the backup reflector node; and receiving periodic heartbeats from the other nodes over the unicast connections.

22. The storage medium of claim 19, wherein communicate the clustering service information with the other node comprises:

receiving a removal notification over a unicast connection with a node being removed from the storage cluster; and in response to the removal notification, updating the cluster directory and sending clustering service updates to remaining nodes in the storage cluster over their remaining unicast connections.

23. A non-transitory computer-readable storage medium comprising instructions, which when executed in a computer system with a storage cluster, causes the computer system to carry out the steps of:

in response to receiving information associated with a reflector node from a centralized virtualization manager, establish a unicast connection with the reflector node in the storage cluster;

contribute storage devices to a clustered datastore pooled with other nodes in the storage cluster and shared across all nodes in the storage cluster;

communicate the clustering service information with the reflector node over the unicast connection;

run one or more virtual machines (VMs);

store the one or more VMs as objects in the clustered datastore; and use a cluster directory to access the objects stored in the clustered datastore.

24. The storage medium of claim 23, wherein communicate the clustering service information with the reflector node comprises receiving a first periodic heartbeat from the reflector node over the unicast connection or sending a second periodic heartbeat to the reflector node over the unicast connection.

25. The storage medium of claim 23, wherein communicate the clustering service information with the reflector node comprises receiving a clustering service update from the reflector node over the unicast connection after a node has been removed from the storage cluster.

26. The storage medium of claim 23, further comprising instructions executable by the processor to:
   receive a command from the reflector node to take a role of a backup reflector node; and
   take the role of the backup reflector node.

27. The storage medium of claim 26, further comprising instructions executable by the processor to, after detecting the reflector node is down:
   remove the unicast connection with the reflector node;
   switch role to become a new reflector node;
   establish new unicast connections with remaining nodes in the storage cluster;
   select a new backup reflector node from the remaining nodes; and
   update its cluster directory and sending clustering service updates to the remaining nodes over the new unicast connections to synchronize their cluster directories.

* * * * *